US009662758B2

(12) United States Patent
Cowie

(10) Patent No.: US 9,662,758 B2
(45) Date of Patent: May 30, 2017

(54) CHAINSAW GUIDE BAR STRAIGHTENER

(71) Applicant: James Cowie, Miramichi (CA)

(72) Inventor: James Cowie, Miramichi (CA)

(*) Notice: Subject to any disclaimer, the term of this patent is extended or adjusted under 35 U.S.C. 154(b) by 0 days.

(21) Appl. No.: 14/998,706

(22) Filed: Feb. 4, 2016

(65) Prior Publication Data

US 2016/0236252 A1 Aug. 18, 2016

Related U.S. Application Data

(60) Provisional application No. 62/176,207, filed on Feb. 12, 2015.

(51) Int. Cl.

| | |
|---|---|
| ***G01N 3/02*** | (2006.01) |
| ***B24B 3/60*** | (2006.01) |
| ***B27B 17/02*** | (2006.01) |
| ***B21D 3/16*** | (2006.01) |

(52) U.S. Cl.

CPC .................. *B24B 3/60* (2013.01); *B21D 3/16* (2013.01); *B27B 17/02* (2013.01)

(58) Field of Classification Search

CPC .............. B24B 3/60; B21D 3/16; B27B 17/02

USPC ................................... 73/760, 839, 847, 856

See application file for complete search history.

(56) References Cited

U.S. PATENT DOCUMENTS

| | | | | |
|---|---|---|---|---|
| 1,972,285 A | | 9/1934 | Bennett | |
| 2,962,812 A | | 12/1960 | Gommel | |
| 3,796,242 A | | 3/1974 | Albright | |
| 3,991,799 A | | 11/1976 | Albright | |
| 4,020,880 A | * | 5/1977 | Heller | H05K 13/023 140/105 |
| 4,116,250 A | | 9/1978 | Ericsson | |
| 4,590,779 A | * | 5/1986 | Stange | B21D 5/004 226/150 |
| 5,052,109 A | | 10/1991 | Vanderzanden et al. | |
| 5,785,101 A | | 7/1998 | Wildey | |
| 5,884,406 A | | 3/1999 | Leini | |
| 6,125,733 A | * | 10/2000 | Hwang | B26D 1/46 83/651.1 |
| 6,134,932 A | * | 10/2000 | Marque | B21D 11/07 72/149 |
| 2002/0162441 A1 | * | 11/2002 | Dumas | B27B 17/0058 83/796 |
| 2012/0176806 A1 | * | 7/2012 | Baratta | B27B 17/02 362/382 |

* cited by examiner

*Primary Examiner* — Max Noori

(74) *Attorney, Agent, or Firm* — Mario Theriault

(57) ABSTRACT

The chainsaw guide bar straightener has a flat table having a length of about ⅔ of the nominal length of a chainsaw guide bar, and a clamp on one corner of the table. The clamp is used for pressing the guide bar down against the table along a diagonal of the guide bar, for better measuring deformation in the guide bar. In another aspect, the chainsaw guide bar straightener has a pair of spaced apart anvil posts mounted to the frame thereof. These anvil posts define an open space there between. The chainsaw guide bar straightener further includes an hydraulic cylinder mounted to the machine frame. The hydraulic cylinder has a rod end head being movable along a working axis extending between the anvil posts and being centered with the open space, for straightening a chainsaw guide bar that is positioned between the rod end head and the anvil posts.

19 Claims, 3 Drawing Sheets

CHAINSAW GUIDE BAR STRAIGHTENER

The present application claims the benefit of U.S. Provisional Application No. 62/176,207, filed Feb. 12, 2015.

FIELD OF THE INVENTION

This invention pertains to straightening devices and more particularly this invention pertains to machines for straightening and reconditioning chainsaw guide bars that have compound bends, twists, tip bearing failures, or chain groove damages.

BACKGROUND OF THE INVENTION

The present invention also pertains to the field of modern tree harvesting operations that are carried out using a tree harvesting and processing head mounted to the boom of an excavator-like machine. An example of such tree harvesting and processing heads is illustrated in: U.S. Pat. No. 5,785,101 issued to A. J. Wildey on Jul. 28, 1998.

Modern tree harvesting and processing heads have a chainsaw bar mounted to the lower end thereof for cutting a tree from its stump. The harvesting head has a pair of driven rollers to feed the tree against cutting knives encircling the tree trunk, for cutting the branches off the tree trunk. The driven rollers are also used in combination with the chainsaw for cutting the tree trunk into log lengths.

These tree harvesting and processing machines are operated entirely by hydraulic power and controlled by manual valves. These machines are relatively complicated, and a good understanding and coordination of its elements is required to operate them.

A new operator can damage several chainsaw bars before a training period is completed. For example, if the driven rollers are operated when the chainsaw guide bar is deployed, even a slight movement of the head relative to the tree trunk causes the guide bar to bind in its cut and to bend. Similarly, if any movement of the machine itself occurs, backward, forward or a tilt at the same time as the chainsaw guide bar is being deployed, the bar binds in its cut and gets damaged. It is well known, that any slight deformation in a chainsaw bar is unacceptable. When such an incident occurs, the chainsaw bar must be replaced before harvesting operation can be resumed.

In the past, the structures of some chainsaw guide bars have been modified so that minimum irreversible damage would occur during a mishap by the operator. These repairable guide bars are illustrated and described in the following documents:

U.S. Pat. No. 5,052,109 issued to J. L. Vanderzanden et al. on Oct. 1, 1991, and U.S. Pat. No. 5,884,406 issued to A. Leini on Mar. 23, 1999.

Although these guide bars are claimed to be repairable, there is no apparatus in the prior art to effectively and precisely straighten a damaged guide bar. It is believed that this deficiency in the prior art has largely contributed to limit the commercial success of these repairable guide bars.

For these reasons it is believe that there is a market need for a chainsaw guide bar straightener that is convenient to use in repairing damaged guide bars, whether the guide bars are of the repairable type or of the conventional type.

SUMMARY OF THE PRESENT INVENTION

In the present invention, there is provided a guide bar straightener that includes a press and anvil to remove simple bends, a torsion device to remove twists, a flatness gauge, a straightness gauge, a grinder to repair damage chain grooves, and an anvil to replace tip bearings.

In a first aspect of the present invention, there is provided a chainsaw guide bar straightener for repairing chainsaw guide bars. The machine comprises a flat table having a length of about ⅔ of the nominal length of a chainsaw guide bar. The table has a clamp on one corner thereof The clamp is used for pressing the chainsaw guide bar down against the table along a diagonal on the chainsaw guide bar, for better measuring deformation in the chainsaw guide bar.

In another aspect of the present invention, the chainsaw guide bar straightener comprises a machine frame; a pair of spaced apart anvil posts mounted to the machine frame along a longitudinal axis of the machine frame. These anvil posts define an open space there between. The chainsaw guide bar straightener further includes an hydraulic cylinder mounted to the machine frame. The hydraulic cylinder has a rod end head being movable along a working axis extending along the longitudinal axis, between the anvil posts and being centered with the open space. The cylinder is operable for straightening a chainsaw guide bar that is positioned between the rod end head and the anvil posts.

In a further aspect of the present invention, there is provided a chainsaw guide bar straightener for repairing chainsaw guide bars, comprising: a transverse slot for receiving and retaining a first portion of a chainsaw guide bar therein and a working slot spaced apart from the transverse slot for receiving a second portion of the chainsaw guide bar therein. The working slot is selectively aligned with the transverse slot. The working slot is selectively rotatable relative to the transverse slot for twisting the second portion of the chainsaw guide bar relative to the first portion when the chainsaw guide bar is mounted in the transverse slot and the working slot.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the chainsaw guide bar straightener according to the present invention is described with the aid of the accompanying drawings, in which like numerals denote like parts throughout the several views.

Figure 1:
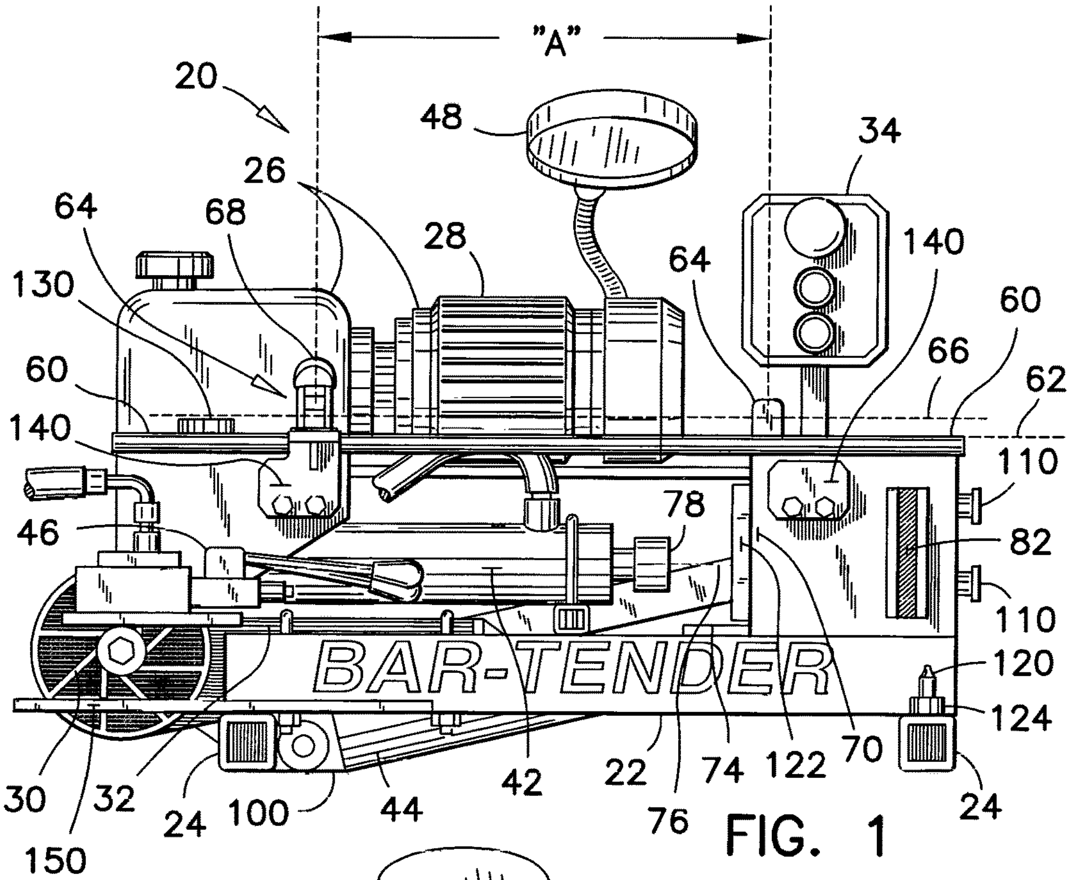
FIG. 1 is a front elevation view of the preferred chainsaw guide bar straightener.

The drawings presented herein are presented for convenience to explain the functions of all the elements includes in the preferred embodiment of the present invention. Elements and details that are obvious to the person skilled in the art may not have been illustrated. Conceptual sketches have been used to illustrate elements that would be readily understood in the light of the present disclosure. These drawings are not fabrication drawings, and should not be scaled.

The machine according to the preferred embodiment of the present invention is also described in term of its operation and the function of its components. The physical dimensions, material types, and manufacturing tolerances are not provided because these details also do not constitute the essence of the present invention and would be considered obvious to the skilled artisan having acquired the knowledge that is actually provided in the present document.

DESCRIPTION OF THE PREFERRED EMBODIMENT

The preferred embodiment of the chainsaw guide bar straightener according to the present invention is described herein below with reference to the attached drawings.

Referring to FIGS. 1 to 4 the elements of the preferred chainsaw guide bar straightener will be described. Basically, the preferred bar straightener 20 comprises a frame 22 sitting of two cross-members 24. It will be understood that the cross members 24 can be mounted to a stand of appropriate height or to a work table (not illustrated).

The machine 20 is electrically operated. The machine 20 has a self-contained hydraulic pump 26 operated by an electric motor 28. The machine also has a grinding wheel 30 and grinder motor 32 mounted inside the frame 22. Electric controls 34 are provided to start and stop the electric motors 28, 32. The hydraulic system 26 operates a straightener cylinder 42 and a twist-remover cylinder 44, by way of a pair of hydraulic valves 46.

An adjustable light 48 mounted above the bar-inspection station is also recommended to detect a slight bend and/or twist in a chainsaw bar, to remove these defects and to reinspect the bar.

Figure 8:
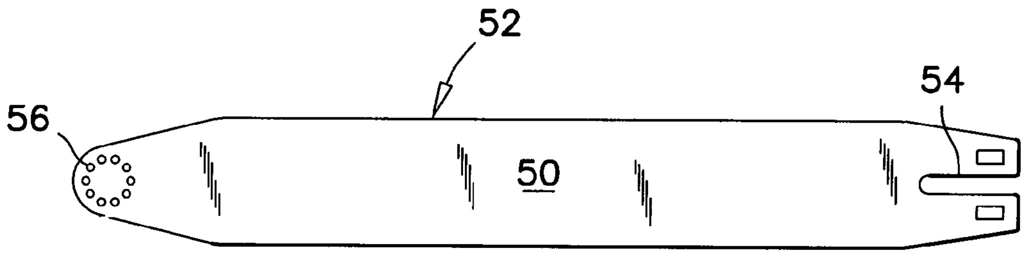
FIG. 8 is a side view of a typical chainsaw guide bar.

An illustration of a chainsaw guide bar 50 that is mentioned herein is illustrated for reference in FIG. 8. These guide bars 50 are used on multi-function tree harvesting heads. As mentioned before, any unintentional movement of the head when the saw bar is in operation often results in damage to the guide bar. A majority of these damaged guide bars can be repaired on the chainsaw guide bar straightener according to the preferred embodiment of the present invention and used again.

For reference purposes, the guide bar 50 has a groove 52 along its edge (not shown) in which a saw chain is guided. The bar has a mounting end with a mounting slot 54 and a driven end with a tip bearing (not shown). The tip bearing is retained in sandwich between two outside laminae of the bar by a series of steel rivets 56.

The bar straightener according to the preferred embodiment of the present invention has the following elements for reconditioning a damaged saw bar 50.

A) An inspection station or table that is made of two round bars 60 mounted to and above the main frame 22. The round bars 60 are parallel and levelled with each other and constitute a straight horizontal flat plane as illustrated by dashed line 62. A pair of spaced apart transverse bars 64 are mounted to the round bars 60. This pair of transverse bars 64 are mounted parallel and form a second flat horizontal plane as shown by the dashed line 66. One of the transverse bars 64 has a toggle clamp 68 mounted to one end thereof The spacing “A” between the transverse bars 64 is about ⅔ or longer than a common length of guide bars to be repaired.

Upon receiving of a damaged guide bar 50, the bar is placed on the transverse bars 64 and the toggle clamp 68 is used to press the side of the bar down against the transverse bars 64, along an extremity of an imaginary diagonal line along the bar. A machinist’s straight edge (not shown) is then used to determine the location of a bend or a twist in the guide bar. As can be understood, the clamping of the damaged guide bar 50 along a diagonal thereof, causes the bar to tilt and to exaggerate the defect at the free end of the saw bar. This method of inspecting a guide bar allows the operator to detect the smallest defect in a damaged guide bar and to repair it with precision.

Figure 3:
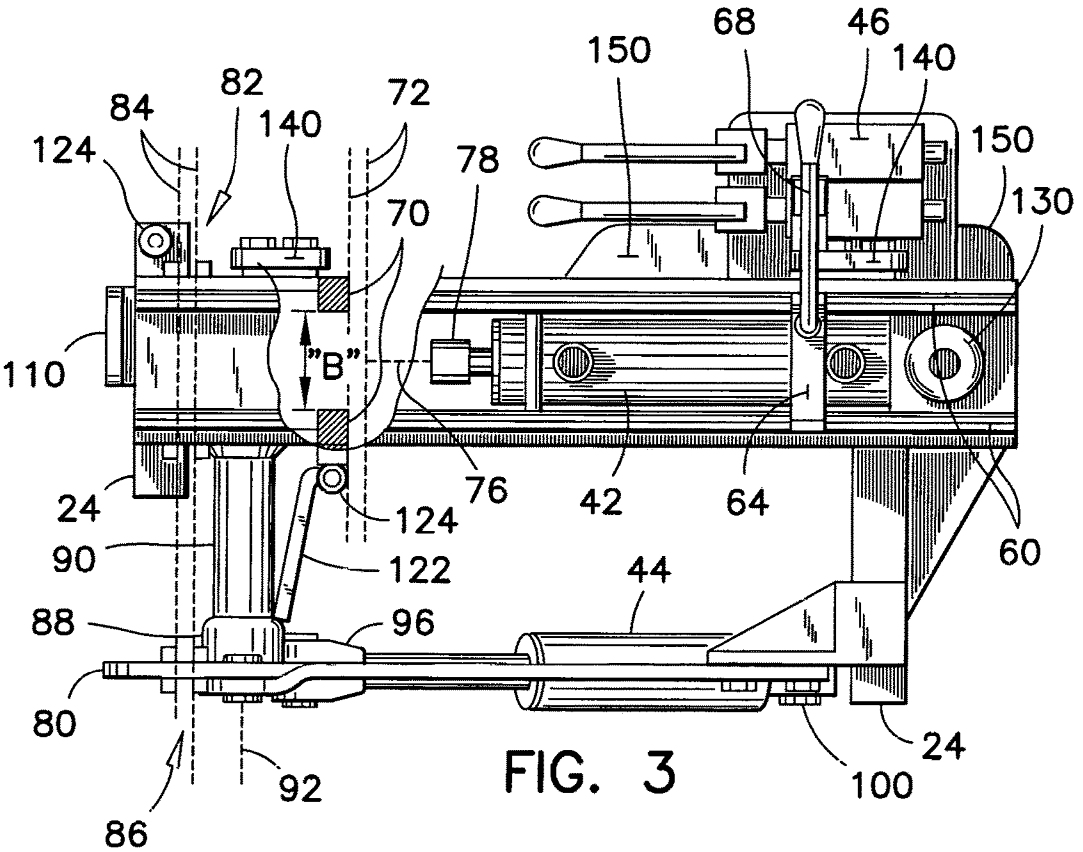
FIG. 3 is a partial, cut-away top view of the preferred chainsaw guide bar straightener.

B) A bar straightener comprises the straightener cylinder 42 mentioned before and a pair of anvil posts 70 which are better seen in FIG. 3. The hydraulic cylinder 42 has a working axis 76 extending between the anvil posts 70, along a center of an open area defined by the anvil posts 70. It will be appreciated that the working axis 76 extends along the longitudinal axis of the machine frame 22.

During the straightening of a saw guide bar 50, the saw guide bar is held in a position as shown by dashed line 72. During the straightening of a guide bar 50, the bar is held by hand with its lower edge laid against the guide table 74. The straightening cylinder 40 has a rod end cap 78 thereon, with a relatively large diameter to prevent marking the surface of the guide bar 50. The relatively large rod end cap 78 has other functions that will be explained later.

When a bend is found in a saw bar 50, the bend is centered with the rod end 78 of the straightener cylinder 42, and the appropriate valve 46 is activated to extend the cylinder 42 to press the bar against the anvil posts 70 to bend the guide bar 50 in the opposite direction of the bend, just enough to overcome the yield strength in the bar 50 and to remove the bend. The process of measuring and straightening may be repeated several times before the guide bar 50 is straight. Although guide bars 50 have different lengths, the cross-section of these guide bars 50 are substantially the same and therefore, a same force on the straightening cylinder 42 will give substantially the same result. Therefore, the operator of this machine can gather experience very quickly and become efficient at straightening guide bars 50.

The anvil posts 70 are fastened to the frame 22 at their lower ends and to the parallel rods 60 at their upper ends. It will be appreciated that the parallel rods 60 constitute a pair of tie rods to reinforce the anvil posts 70. The anvil posts 70 are spaced apart a same distance “B” as the depth of a common chainsaw guide bar 50 or slightly wider.

Figure 2:
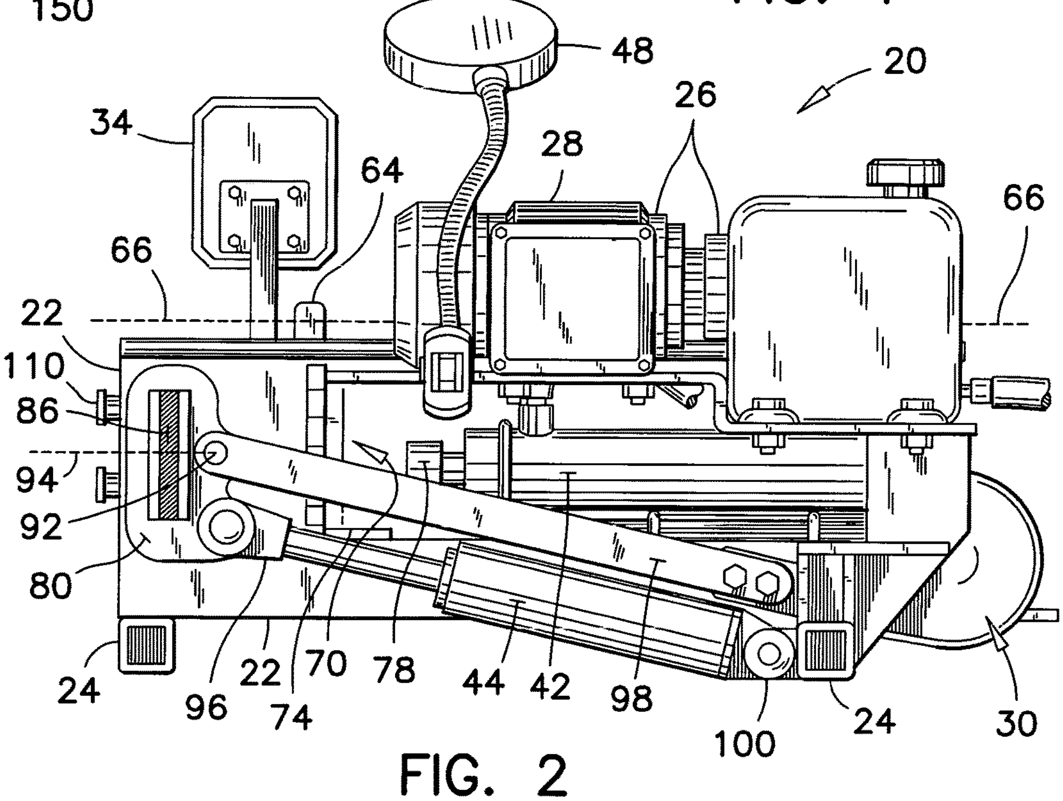
FIG. 2 is a rear elevation view of the preferred chainsaw guide bar straightener.
Figure 4:
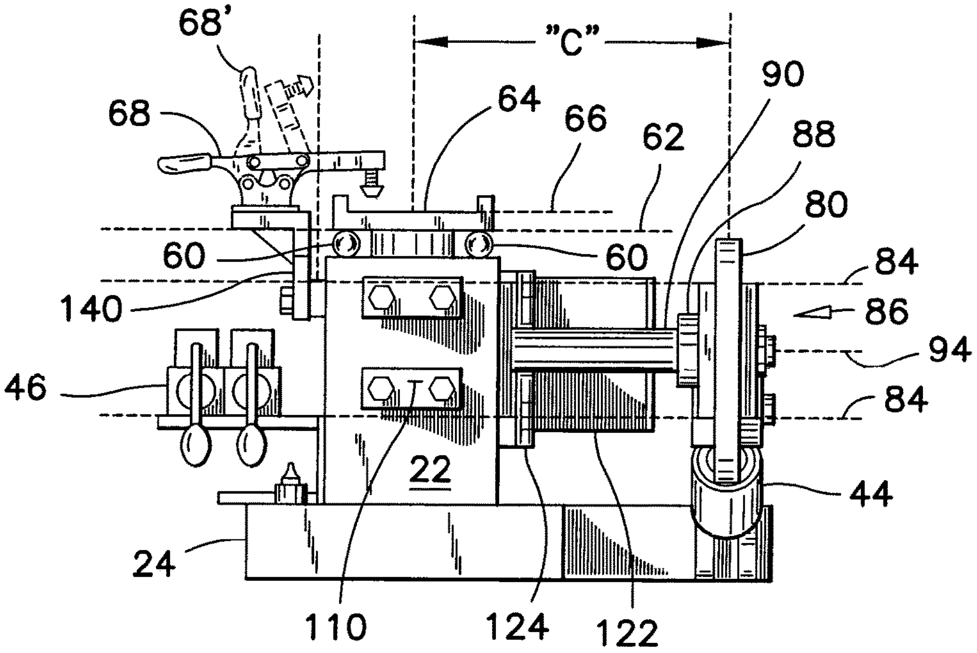
FIG. 4 is a partial end view of the preferred chainsaw guide bar straightener.

C) A twist-remover tool is made of the twist-remover cylinder 44 operating a pivoting frame 80. Referring particularly to FIGS. 2 to 4, this twist-remover tool will be described. During the removing of a twist in a guide bar 50, the guide bar 50 is inserted through transverse slots 82 in the frame 22, as shown by dashed lines 84 in FIG. 3. The saw bar 50 is mounted to extend through both sides of the frame 22 and into a working slot 86 in the pivoting frame 80. The pivoting frame 80 is mounted at a distance “C” from the center line of the frame 22. This distance is about half the length of the longest saw bar 50 to be repaired. The pivoting frame 80 is mounted to a pivoting bearing 88 on a stub shaft 90. The bearing 88 of the pivoting frame 80 is movable about the stub shaft 90 on a rotational axis 92 that is centered with the height of the working slot 86 as indicated by dashed line 94. The rotational axis 92 is positioned laterally as close as possible from a line perpendicular to a midpoint of a vertical dimension of the working slot 86 and the transverse slot 82 such that the torque of the operation is applied as close as possible from the longitudinal axis of the saw blade 50 being repaired.

The pivoting frame 80 is rotated about the stub shaft 90 by the twist-remover cylinder 44. For that purpose the twist-remover cylinder 44 has its rod end 96 connected to the lower portion of the pivoting frame 80 at a radius from the rotational axis 92.

A stiffening bar 98 is provided between the stub shaft 90 and the anchor point 100 of the twist-remover cylinder 44 to prevent damaging the stub shaft 90 during demanding operations of the machine. The stiffening bar 98 is preferably easily removable from its mounting, by bolts, to accommodate the working of an extra long blade in the bend-removing section of the machine.

D) The preferred bar straightening machine also has elements to measure the straightness of the mounting slot 54 on the mounting end of the guide bar 50. Each mounting slot gauge 110 has a T-shaped cross section and is mounted to the right end of the machine. A pair of these gauges 110 are provided to measure the width of guide slots 54 on common makes of guide bars 50. In use, the guide slot 54 is inserted over the gauge 110. If excessive play of the bar on the gauge 110 is noticed, the guide bar 50 is generally classified as unrepairable.

Figure 6:
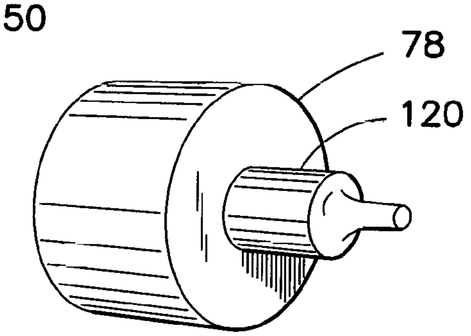
FIG. 6 is a perspective view of an adapter punch for removing fasteners on guide bars when replacing tip bearings.
Figure 7:
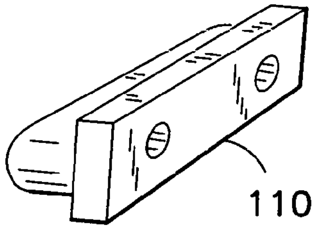
FIG. 7 is a perspective view of a gauge block for determining the severity of the damages on a guide bar to be repaired.

E) The tip bearing on a guide bar 50 can be replaced by removing the rivets 56 using the straightening cylinder 42, a punch 120 mounted in the rod end head 78 of the straightening cylinder 42 as can be seen in FIG. 6, and an anvil plate 122. The anvil plate 122 is mounted to a hinge 124 as can be seen in FIG. 3. The hinge 124 is affixed to one of the anvil posts 70. The anvil plate 122 can be swung across the travel of the straightening cylinder 42 and set to rest against the two anvil posts 70. The anvil plate 122 has a hole in its center (not shown) registering with the punch 120 when the punch 110 is mounted to the rod end head 78. Every rivet 56 is removed by manually aligning each rivet 56 with the punch 120 and forcing it out through the hole (not shown) in the anvil plate 122 using the straightening cylinder 42 When not used, the punch 120 is stowed away in a socket 124 on one of the cross members 24. The large diameter rod end head 78 mentioned before is advantageous for setting new rivets 56 during the installation of a new tip bearing. The final flattening of new rivets 56 is done against the anvil plate 122.

F) A new tip bearing is preferably installed when the guide bar 50 is laid flat on the transverse bars 64 with its tip end laid against a tip-rest anvil 130. The top-rest anvil 130 is mounted on the machine frame 22 such that its top surface lays along the flat plane 66. The rivets 56 of the bearings can be hammered down at this location, but are preferably flattened using the cylinder 42 and anvil plate 122. The final grinding of the rivets is done with the guide bar 50 laid flat against the tip-rest anvil 130.

Figure 5:
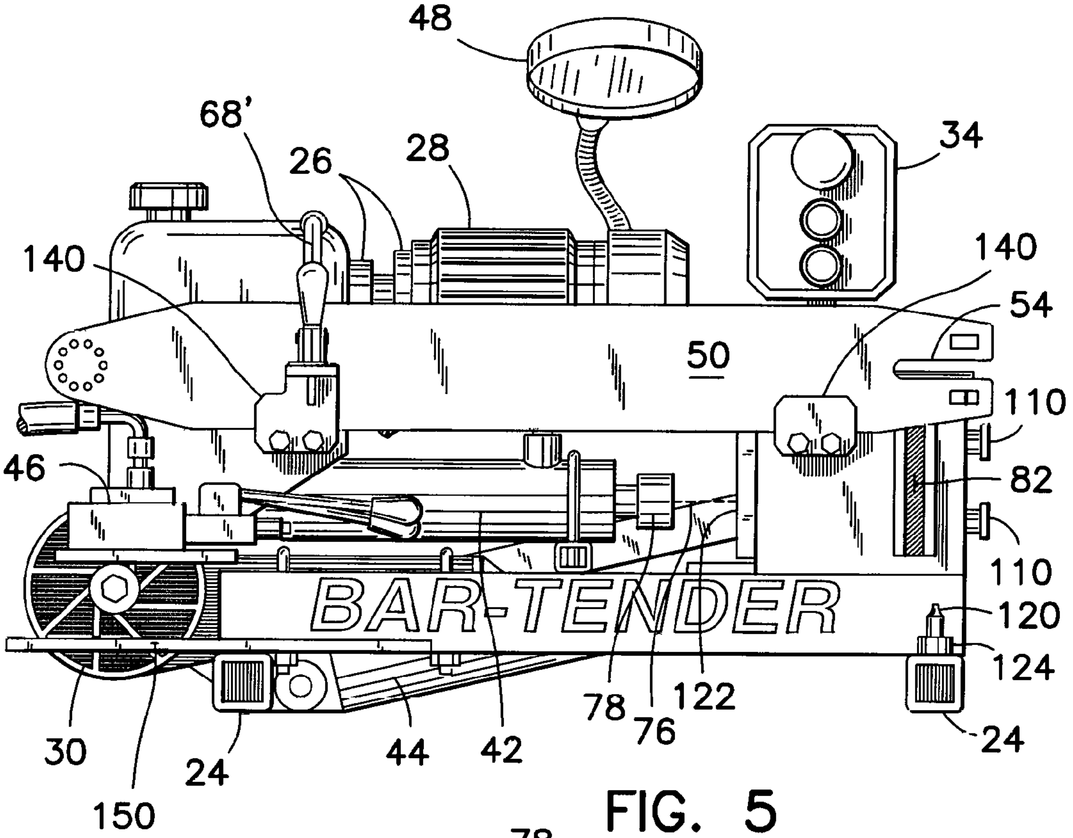
FIG. 5 is another front elevation view of the preferred chainsaw guide bar straightener with a guide bar positioned in the straightness gauge blocks.

G) A pair of inspection support blocks 140 are provided along the frame 22, for supporting a saw bar on its edge as illustrated in FIG. 5. As can be understood, these inspection support blocks 140 form with the frame 22 a pair of aligning U-shaped grooves, in which a saw guide bar 50 is firmly held on its edge. In that position, the chain guide groove 52 in the saw guide bar 50 can be inspected, filed and cleaned. It will be appreciated that the use of the inspection support blocks is effected with the toggle clamp 68 in a fully opened position as shown by label 68' in FIGS. 4 and 5.

H) When a saw guide bar 50 has been straightened, cleaned and fully inspected, its edge can be sharpened to remove any chain wear lip along its edge. The grinder portion of the machine comprises the grinder motor 32 operating the aforesaid grinding wheel 30. A grinding support table 150 extends from the frame 22 in front of the grinding wheel 30 at a right angle with the face of the grinding wheel 30. The table 150 is used for supporting a saw guide bar 50 during the sharpening of the edge of the bar against the grinding wheel 28.

Having described the tools included in the preferred guide bar straightener, a preferred method for repairing saw bars comprises the following steps in the preferred sequence:

1) Measure the deflection in the guide slot 54 of the guide bar, using one of the gauges 110. Then decide to discard or to repair that guide bar;

2) Measure the deflection in the guide bar 50 using a machinist's straight edge, by placing the guide bar 50 on the transverse bars 64 and clamping it down using the clamp 68;

3) Remove any bend in the bar using the bend removing cylinder 42 and anvil posts 70;

4) Remove any twist in the bar using the twist-removing cylinder 44;

5) Repeat the steps 2-4 until the bar is straight;

6) Replace the tip bearing if required using the punch 120 and anvil plate 122, and/or the tip-rest anvil 130.

7) Inspect the chain guide groove and clean the groove if required by placing the saw bar 50 on the inspection supports 140;

8) Sharpen the edge of the guide bar against the grinding wheel 30.

While one embodiment of the present invention has been illustrated in the accompanying drawings and described herein above, it will be appreciated by those skilled in the art that various modifications, alternate constructions and equivalents may be employed. Therefore, the above description and illustrations should not be construed as limiting the scope of the invention, which is defined in the appended claims.

What is claimed is:

1. A chainsaw guide bar straightener for repairing chainsaw guide bars, comprising:

a machine frame;

a pair of spaced apart anvil posts mounted to said machine frame; said anvil posts defining an open space there between;

an hydraulic cylinder mounted to said machine frame; said hydraulic cylinder having a rod end head being movable along a working axis extending between said anvil posts and being centered with said open space, for straightening a chainsaw guide bar when said chainsaw guide bar is positioned between said rod end head and said anvil posts.

2. The chainsaw guide bar straightener as claimed in claim 1, further including:

a transverse slot for receiving and retaining a first portion of a chainsaw guide bar therein;

a working slot spaced apart from said transverse slot for receiving a second portion of said chainsaw guide bar therein; said working slot selectively aligning with said transverse slot; said working slot being selectively rotatable relative to said transverse slot for twisting said second portion of said chainsaw guide bar relative to said first portion when said chainsaw guide bar is mounted in said transverse slot and said working slot.

3. The chainsaw guide bar straightener as claimed in claim 1, wherein a spacing between said anvil posts is a depth of said chainsaw guide bar.

4. The chainsaw guide bar straightener as claimed in claim 1, further including a guide table between said anvil posts for holding said chainsaw guide bar across said working axis of said cylinder.

5. The chainsaw guide bar straightener as claimed in claim 1, further including:

a flat table having a length of about ⅔ of a nominal length of said chainsaw guide bar;

a clamp on one corner of said table for pressing said chainsaw guide bar down against said table along a diagonal of said chainsaw guide bar, for measuring deformation in said chainsaw guide bar.

6. The chainsaw guide bar straightener as claimed in claim 1, further including:

a hinge mounted to one of said anvil posts, and an anvil plate movably mounted to said hinge, for selectively covering said open space between said anvil posts.

7. The chainsaw guide bar straightener as claimed in claim 1, further including a chainsaw guide bar grinder and a bar grinder table for guiding a chainsaw guide bar along said chainsaw guide bar grinder.

8. The chainsaw guide bar straightener as claimed in claim 5, further including a pair of spaced apart guide bar support blocks mounted to said frame for holding a chainsaw guide bar in a vertical alignment along said flat table.

9. The chainsaw guide bar straightener as claimed in claim 6, further including:

a hole through said anvil plate, and a punch mounted to said rod end head; said punch being mounted to register with said hole in said anvil plate.

10. The chainsaw guide bar straightener as claimed in claim 1, further including a gauge for measuring damage in a chainsaw guide bar mounting slot.

11. The chainsaw guide bar straightener as claimed in claim 5, further including a light adjustably mounted above said flat table.

12. The chainsaw guide bar straightener as claimed in claim 5, including an electric motor and hydraulic power system.

13. A chainsaw guide bar straightener for repairing chainsaw guide bars, comprising:

a rectangular transverse slot for receiving and retaining a first portion of a chainsaw guide bar therein;

a rectangular working slot spaced apart from said rectangular transverse slot along a linear dimension for receiving a second portion of said chainsaw guide bar therein; said rectangular working slot selectively aligning with said rectangular transverse slot; said rectangular working slot being selectively rotatable relative to said rectangular transverse slot in a plane extending perpendicularly to said linear dimension for twisting said second portion of said chainsaw guide bar relative to said first portion when said chainsaw guide bar is mounted in said rectangular transverse slot and said rectangular working slot.

14. The chainsaw guide bar straightener as claimed in claim 13, wherein said working slot is rotatable about a rotation axis lying on a line perpendicular to a midpoint of a vertical dimension of said transverse slot.

15. The chainsaw guide bar straightener as claimed in claim 14, further comprising:

a machine frame;

a pivoting frame enclosing said working slot and said rotational axis, said pivoting frame being mounted to a stub shaft extending from said machine frame along said rotational axis; and an hydraulic cylinder connected to said machine frame and to said pivoting frame for rotating said pivoting frame about said rotational axis.

16. The chainsaw guide bar straightener as claimed in claim 15, wherein said hydraulic cylinder is mounted to a portion of said pivoting frame offset from said rotational axis, and further comprising a stiffening bar mounted to said rotational axis and to said machine frame for reinforcing said stub shaft.

17. The chainsaw guide bar straightener as claimed in claim 16, wherein said stiffening bar is removably mounted to said machine frame by bolts.

18. The chainsaw guide bar straightener as claimed in claim 14, wherein said chainsaw guide bar has a nominal length and said working slot is offset from a midpoint along horizontal dimension of said transverse slot a distance equivalent to about ⅔ of said length of said chainsaw guide bar.

19. The chainsaw guide bar straightener as claimed in claim 18, further including a pair of spaced apart guide bar support blocks mounted to said machine frame for holding said chainsaw guide bar in a vertical alignment and inspecting said chainsaw guide bar.

* * * * *